(12) United States Patent
Hollman et al.

(10) Patent No.: US 8,211,225 B2
(45) Date of Patent: Jul. 3, 2012

(54) MAGNETIC PIGMENTS AND PROCESS OF ENHANCING MAGNETIC PROPERTIES

(75) Inventors: Aaron M. Hollman, Hebron, KY (US); Philippe Schottland, West Chester, OH (US)

(73) Assignee: Sun Chemical Corp., Parsippany, NJ (US)

( * ) Notice: Subject to any disclaimer, the term of this patent is extended or adjusted under 35 U.S.C. 154(b) by 680 days.

(21) Appl. No.: 12/100,026

(22) Filed: Apr. 9, 2008

(65) Prior Publication Data

US 2009/0255442 A1     Oct. 15, 2009

(51) Int. Cl.
C09C 1/00 (2006.01)
C09C 1/36 (2006.01)
C09C 1/22 (2006.01)
B05D 1/36 (2006.01)

(52) U.S. Cl. ...... 106/456; 106/418; 106/439; 427/419.2

(58) Field of Classification Search .......... 106/415, 106/417, 718, 439, 459; 427/419.2
See application file for complete search history.

(56) References Cited

U.S. PATENT DOCUMENTS

| | | | |
|---|---|---|---|
| 2,989,411 A | 6/1961 | Suchow | |
| 3,087,829 A | 4/1963 | Linton | |
| 3,926,659 A * | 12/1975 | Bernhard et al. | 106/418 |
| 4,544,415 A | 10/1985 | Franz et al. | |
| 4,606,914 A | 8/1986 | Miyoshi | |
| 4,622,074 A | 11/1986 | Miyoshi et al. | |
| 4,744,832 A | 5/1988 | Franz et al. | |
| 4,828,826 A | 5/1989 | Franz et al. | |
| 4,838,648 A | 6/1989 | Phillips et al. | |
| 4,865,834 A | 9/1989 | Tanihara et al. | |
| 4,867,793 A | 9/1989 | Franz et al. | |
| 4,948,631 A | 8/1990 | Ostertag et al. | |
| 5,002,751 A | 3/1991 | Wiese et al. | |
| 5,223,360 A | 6/1993 | Prengel et al. | |
| 5,246,492 A | 9/1993 | Arima et al. | |
| 5,326,392 A | 7/1994 | Miller et al. | |
| 5,368,639 A | 11/1994 | Hasegawa et al. | |
| 5,472,491 A | 12/1995 | Duschek et al. | |
| 5,486,631 A | 1/1996 | Mitchnick et al. | |
| 5,522,923 A * | 6/1996 | Kimura et al. | 106/418 |
| 5,571,851 A | 11/1996 | Freeman et al. | |
| 5,759,255 A | 6/1998 | Venturini et al. | |
| 6,139,614 A | 10/2000 | Schmid et al. | |
| 6,280,714 B1 | 8/2001 | Arnaud et al. | |
| 6,372,517 B1 | 4/2002 | Lange | |
| 6,451,294 B1 | 9/2002 | Simon | |
| 6,485,556 B1 | 11/2002 | DeLuca, Jr. et al. | |
| 6,589,331 B2 | 7/2003 | Ostertag et al. | |
| 6,616,745 B1 | 9/2003 | Navarti et al. | |
| 6,620,233 B1 * | 9/2003 | Seeger et al. | 106/417 |
| 6,645,286 B2 | 11/2003 | Ostertag et al. | |
| 6,663,852 B2 | 12/2003 | Simon | |
| 6,719,838 B2 | 4/2004 | Heider et al. | |
| 6,759,097 B2 | 7/2004 | Phillips et al. | |
| 6,773,499 B2 | 8/2004 | Schoen et al. | |
| 6,790,452 B2 | 9/2004 | Kishida et al. | |
| 6,875,264 B2 | 4/2005 | Zimmerman et al. | |
| 6,902,807 B1 | 6/2005 | Argoitia et al. | |
| 7,258,900 B2 | 8/2007 | Raksha et al. | |
| 2006/0070552 A1 | 4/2006 | Loch et al. | |
| 2007/0028799 A1 | 2/2007 | Kniess et al. | |
| 2007/0154561 A1 * | 7/2007 | Takeda et al. | 424/489 |
| 2008/0115694 A1 | 5/2008 | Hollman et al. | |

FOREIGN PATENT DOCUMENTS

| | | |
|---|---|---|
| DE | 31 51 354 | 7/1983 |
| DE | 32 35 017 | 3/1984 |
| DE | 33 34 598 | 4/1985 |
| DE | 40 30 727 | 4/1992 |
| DE | 44 19 173 | 12/1995 |
| DE | 4419173 | 12/1995 |
| DE | 199 53 655 | 5/2001 |
| DE | 19953655 | 5/2001 |
| EP | 0 090 259 | 10/1983 |
| EP | 0 632 109 | 1/1995 |
| EP | 0 634 459 | 1/1995 |
| EP | 0 649 886 | 4/1995 |
| EP | 0 655 486 | 5/1995 |
| EP | 0655486 | 5/1995 |
| EP | 0 708 154 | 4/1996 |
| EP | 0708154 | 4/1996 |
| WO | WO 96/32446 | 10/1996 |
| WO | WO 97/29059 | 8/1997 |
| WO | WO 99/57204 | 11/1999 |
| WO | WO 01/92425 | 12/2001 |

OTHER PUBLICATIONS

Harding, P.H. et al., "The role of adhesion in the mechanical properties of filled polymer composites," Journal Adhesion Science Tech., vol. 11(4), pp. 471-493.
International Search Report dated Aug. 14, 2009 for Application No. PCT/US2009/038199.
Ponjee, J.J. et al., "Chemical modification of surfaces," Philips Tech. Review, vol. 44(3) (Jul. 1988) pp. 81-88.
Stengl, V. et al., "The preparation and characteristics of pigments based on mica coated with metal oxides," Dyes and Pigments, vol. 58 (2003) pp. 239-244.
Written Opinion dated Aug. 14, 2009 for Application No. PCT/US2009/038199.

* cited by examiner

Primary Examiner — Anthony J Green
Assistant Examiner — Pegah Parvini
(74) Attorney, Agent, or Firm — McKenna Long & Aldridge LLP

(57) ABSTRACT

A pearlescent pigment and a process for enhancing the magnetic properties of a pearlescent pigment. The pearlescent pigment has a layer with regions of $\gamma$-$Fe_2O_3$ and regions of $\alpha$-$Fe_2O_3$. The magnetic properties of a pearlescent pigment may be enhanced by the steps of: providing a platelet pigment with a layer of $Fe_2O_3$, with a magnetic susceptibility less than $0.1 \times 10^{-5}$ m³/kg; reducing some or all of the $Fe_2O_3$ to $Fe_3O_4$; and oxidizing some or all of the $Fe_3O_4$ to $\gamma$-$Fe_2O_3$. The color difference ($\Delta E^*$) between the provided pigment and the resultant pigment is not more than about 5.

15 Claims, No Drawings

MAGNETIC PIGMENTS AND PROCESS OF ENHANCING MAGNETIC PROPERTIES

BACKGROUND

Along with gem stones (e.g., diamond, ruby, emerald, topaz, opal, jade), and precious metals (e.g., gold, silver, platinum), pearls are among the most prized possessions (or luxury items) for human beings for millenniums. Beside their natural beauty, the brilliant color and luster, they are often associated with social status and level of well-being. As a result, and not surprisingly, the trend of cosmetics makeup is to emulate or recreate these "natural" and "aesthetic" appearances of pearl, gem and precious metals with less expensive materials such as interference pigments (e.g., metal oxide coated mica). The most common types of effect pigments are micronized titanium dioxide, metal oxide coated mica, metal oxide coated alumina, metal oxide coated silica, basic lead carbonate, bismuth oxychloride, and natural fish silver.

Metal oxide coated mica pigments are characterized by excellent optical, chemical, mechanical, toxicological, and environmental properties. Natural or synthetic mica, and alternative supports, such as aluminum flakes, or $SiO_2$ platelets, can be used alone, or as a support for titanium dioxide, iron oxide ($Fe_2O_3$ or $Fe_3O_4$), iron ferrocyanide (Iron Blue or Prussian Blue), tin oxide, and chromium oxide. The color space defined by these coated mica-based pigments is based on the type of coating (e.g. metal oxide, colorant, etc.) used, the layer thickness, and the number of coated layers.

Among the natural pearls, the most expensive are black pearls, which come with various undertone and color flops. To faithfully emulate this aesthetic optical effect in cosmetic makeup is one of the top challenges facing a cosmetic pigment maker and formulator. The traditional approach to these pigments is to blend dark solid-color inorganic pigment (e.g., black iron oxide or carbon black) with white platy pearlescent pigments (e.g., $TiO_2$ coated mica, $TiO_2$ coated borosilicate, $TiO_2$ coated alumina). The platy interference pigment provides the luster, brilliance (reflection), transparency and depth of field. The solid-color pigment(s) provide(s) the dark undertone and surface coverage. However, this type of blend usually appears to be much "dirtier", "lack luster", and "lack transparency" compared to the natural pearl. The primary reason for that is fouling of the smooth surface of white pearlescent pigment by the solid-color pigment granules, which leads to light scattering and disruption of light interference.

Metal oxide coated platelet pigments may be magnetic or exhibit magnetic susceptibility. When placed into a liquid coating, regions of the coated pigment may be aligned by an externally applied magnetic field and produce a goniochromatic, or angle dependent optical effect. This effect may be used to create an impression of a two- or three-dimensional image. After the pigments have been aligned, the coating may be cured to solidify the optical effect. Examples of pigments and methods of aligning them are discussed in U.S. Pat. Nos. 6,589,331; 6,902,807; 5,223,360; 6,759,097; and 7,258,900.

The use of metallic colored (copper, bronze, maroon/russet shades, gold, etc.) pearlescent pigments is widespread and can be applied in fields such as decorative cosmetics, plastics, advanced security printing and automotive and industrial coatings. Commercial products currently available include: Iriodin®, Xirallic®, Timiron®, Xirona® and Colorona® lines by Merck, Cloisonné® and Timica® lines by BASF, SunPearl® and Sunshine® lines by SunChemical. Metallic pearlescent shades (bronze, copper, russet, etc.) contained within these lines of pigments are generally developed by deposition of $\alpha$-$Fe_2O_3$ (hematite) on the surface of a platelet-like substrate, such as mica, $Al_2O_3$ platelets, calcium borosilicate, or other laminar substrates. Single-layer pigments of this type have a yellow-red absorbance color combined with an interference color directly related to the thickness of the iron oxide layer. This combination of light reflection, absorption and interference can be utilized to produce lustrous, pearlescent effects ranging from gold to deep maroon shades. In addition, given that iron oxides absorb a portion of the incident light, these pigments are defined by intermediate hiding power relative to transparent $TiO_2$-coated pearlescent pigments and opaque metallic effect pigments (such as aluminum flake).

Pearlescent pigments comprised of a platelet-like substrate coated with $\alpha$-$Fe_2O_3$ generally have magnetic mass susceptibility values in the vicinity of 0.01 to $0.02 \times 10^{-5}$ $m^3/kg$. Thus, these pigments are not easily applicable to printing methodologies that utilize an external magnetic field to manipulate pigment orientation such as those described in U.S. Pat. Nos. 5,223,360; 6,645,286; and 6,759,097. Platelet-like substrates coated with $Fe_3O_4$ (magnetite) are defined by a much higher magnetic susceptibility. For instance, Colorona® Blackstar Red, and Blackstar Gold have magnetic mass susceptibility values of 11.56 and $11.08 \times 10^{-5}$ $m^3/kg$, respectively. These types of pigments can be used in magnetically-aligned coating applications; however, they are generally confined within a very narrow color space (dark shades or dark shades with muted inference colors).

Consequently, a significant need exists for pigments with higher magnetic susceptibility, more colors, and are easier to manufacture.

BRIEF SUMMARY

The above-noted and other deficiencies may be overcome by providing a pigment comprising a substrate and a layer, wherein the layer has regions of $\gamma$-$Fe_2O_3$ and regions of $\alpha$-$Fe_2O_3$.

Magnetic properties of a pigment may be enhanced by the steps of: providing a platelet pigment with a layer of $Fe_2O_3$, with a magnetic susceptibility less than $0.1 \times 10^{-5}$ $m^3/kg$; reducing some or all of the $Fe_2O_3$ to $Fe_3O_4$; and oxidizing some or all of the $Fe_3O_4$ to $\gamma$-$Fe_2O_3$.

In one embodiment, a process for making a pigment comprises the steps of: providing a platelet pigment; increasing the magnetic mass susceptibility; wherein the color difference ($\Delta E^*$) between the provided pigment and the resultant pigment is not more than about 5.

In another embodiment, a pigment may be formed by the steps comprising: providing a platelet pigment; increasing the magnetic mass susceptibility; wherein the color difference ($\Delta E^*$) between the provided pigment and the resultant pigment is not more than about 5.

These and other objects and advantages shall be made apparent from the accompanying drawings and the description thereof.

DETAILED DESCRIPTION

A process for enhancing the magnetic properties of pigments comprises the steps of providing a platelet pigment with a layer of $Fe_2O_3$, with a magnetic susceptibility less than $0.1 \times 10^{-5}$ $m^3/kg$; reducing some or all of the $Fe_2O_3$ to $Fe_3O_4$; and oxidizing some or all of the $Fe_3O_4$ to $\gamma$-$Fe_2O_3$.

In one embodiment, a pearlescent pigment comprises a substrate and a layer, wherein the layer has regions of $\gamma$-$Fe_2O_3$ and $\alpha$-$Fe_2O_3$. In one embodiment, the region of $\gamma$-$Fe_2O_3$ is further from the substrate than the region of $\alpha$-$Fe_2O_3$. Iron oxide coated substrates exhibit intensely colored pearlescent pigments with high luster. Varying the substrate and the iron oxide layer thickness may change the color, luminosity, and transparency of the pigment. The mean thickness of the first layer may be from about 1 nm to about 350 nm, from about 10 nm to about 350 nm, or from about 10 nm to about 250 nm.

In one embodiment, the pigment may comprise a second layer located between the substrate and the first layer, wherein the second layer has a refractive index of greater than about 1.6 or less than about 1.4. The second layer may have a refractive index equal to or greater than about 1.8. In one embodiment the second layer comprises: $TiO_2$, $Fe_2O_3$, FeOOH, $ZrO_2$, $SnO_2$, $Cr_2O_3$, BiOCl, and ZnO. The second layer may comprise one or more materials. The second layer may be $TiO_2$. The second layer may be an iron oxide, such as $Fe_2O_3$, $Fe_3O_4$, FeOOH, FeO, and $Fe(OH)_3$. The mean thickness of the second layer may be from about 50 nm to about 800 nm, or from about 100 nm to about 600 nm.

The synthesis of a particular colored pearlescent pigment begins with selection of the proper substrate material. The substrate may be comprised of natural mica, synthetic mica, glass flakes, metal flakes, talc, kaolin, $Al_2O_3$ platelets, $SiO_2$ platelets, $TiO_2$ platelets, graphite platelet, BiOCl, calcium borosilicate, synthetic alumina, and boron nitride. Examples of glass flakes are borosilicate. Glass flakes are primarily composed of $SiO_2$ and $Al_2O_3$ and can also include ZnO, CaO, $B_2O_3$, $Na_2O$ and $K_2O$ as well as FeO and $Fe_2O_3$. Examples of metal flakes are aluminum, copper, zinc, and other metals and alloys having malleability. Examples of other metals and alloys having malleability are nickel, magnesium, aluminum-copper alloy, aluminum-zinc alloy, aluminum-nickel alloy, and aluminum-magnesium alloy. Metal flakes may be used alone or in any combination thereof. Substrates may be multilayer materials, i.e. include materials of different refractive indices. The substrate may comprise mica. The pearlescent pigment may comprise a mixture of different substrates. The substrate may be made of identical or different flakes which differ in particle size. Other examples of substrates are those that are fibers. Examples of fiber substrates are carbon fiber, glass fiber, and polymeric fibers.

In one embodiment, the substrate is platelet-like and may have a mean thickness of about 0.05 to about 1.5 µm and a mean width of about 1 to about 750 µm. The substrate may have a mean width of about 10 to about 60 µm, about 5 to about 25 µm, about 10 to about 100 µm, about 40 to about 250 µm, or about 95 to about 730 µm.

The preparation of $\alpha$-$Fe_2O_3$ coated platelet-like substrates is well known. In general, deposition of $\alpha$-$Fe_2O_3$ surface layers is achieved by precipitation of FeOOH or various modifications of FeOOH followed by annealing at temperatures ranging between 400 to 1100° C. This process is described in *Dyes and Pigments*, 58 (2003), 239-244, and U.S. Pat. Nos. 3,926,659; 3,087,829; and 3,926,659. The color associated with $\alpha$-$Fe_2O_3$ coated platelet-like pigments is determined by the interplay of light interference and absorption. Through precise control of the $\alpha$-$Fe_2O_3$ layer, lustrous metallic effects can be produced ranging from bronze-yellow to deep red.

Hematite ($\alpha$-$Fe_2O_3$) is a weakly, magnetic iron oxide. Natural mica-based pigments containing layers of $\alpha$-$Fe_2O_3$ generally have magnetic mass susceptibility values ranging from about 0.01 to $0.02 \times 10^{-5}$ $m^3$/kg. Increasing the magnetic mass susceptibility of pearlescent pigments such as these while maintaining their popular and attractive colors will allow for manipulation of the platelet-orientation in uncured coatings or liquid-based suspensions via an applied external magnetic field, expanding the available color space available for magnetically aligned coatings.

The magnetic mass susceptibility may be enhanced by partial reduction of the $\alpha$-$Fe_2O_3$ followed by oxidation to $\gamma$-$Fe_2O_3$. Reduction may be accomplished by many methods such as $NaBH_4$, calcining in a reducing atmosphere, or homogeneous hydrogenation of a suspended solids solution in the presence of a precious metal catalyst. Examples of homogeneous hydrogenation have been described in U.S. Ser. No. 11/931,534 which is hereby incorporated by reference in its entirety.

During hydrogenation of suspended solids solutions, sufficient contact between the $\alpha$-$Fe_2O_3$ coated substrate and catalyst may be achieved if the catalyst and suspending solvent behave as a single homogeneous phase. As the catalyst particle size approaches the nanoscale (1 to 30 nm), the mass transfer limitations inherent to heterogeneous catalysts are mitigated due to a very high catalyst surface area to volume ratio.

Agitation influences reduction because it controls the interfacial area for hydrogen transport into the solvent and prevents substrate settling. Although increased agitation will generally result in improved reduction rates, it may also result in a loss of pigment luster due to pigment fragmentation (particularly for particles greater than 60 µm). Increased catalyst loading or time will result in further reduction of the Fe(III) surface layer and higher magnetic mass susceptibility.

Reduction converts $Fe_2O_3$ to $Fe_3O_4$ that when oxidized to $\gamma$-$Fe_2O_3$ will not change the color of the final pigment significantly relative to the starting substrate. After reduction, the pigment produced is significantly darker than its corresponding starting substrate. Dependent on the level of reduction, the magnetic mass susceptibility of the starting substrate can be increased by up to 3 orders of magnitude.

In order to restore the original color of the starting substrate, the hydrogenated pigment is oxidized. One method of oxidizing the iron oxide is by calcination at temperatures greater than about 350° C. The calcination may be at a temperature ranging from 400 to 1100° C. The calcination may be in an oxidizing atmosphere, such as air. Calcination transforms the outer magnetite layer into maghemite ($\gamma$-$Fe_2O_3$), another highly magnetic iron oxide, thus yielding a magnetic pigment with relatively equivalent color ($\Delta E^*$ less than about 1) compared to the starting pigment.

Following re-oxidation, the overall amount of $Fe_2O_3$ contained on the pigment is nearly equivalent. The only change is the form of the $Fe_2O_3$ (i.e., mica+$\alpha$-$Fe_2O_3$ is converted to mica+$\alpha$-$Fe_2O_3$+$\gamma$-$Fe_2O_3$) which results in minimal color change but dramatic change in the magnetic mass susceptibility. In one embodiment, the ratio of $\alpha$-$Fe_2O_3$ to $\gamma$-$Fe_2O_3$ is between about 0.05 and about 50. Thus, metallic shade pearlescent pigments may be transformed into magnetic pigments significantly increasing the color space available for magnetically-aligned coating applications. In one embodiment, the color difference ($\Delta E^*$) of the pigment prior to reduction and after oxidation is not more than about 5. In one embodiment, the pigment has a magnetic susceptibility of about $0.1 \times 10^{-5}$ to $15 \times 10^{-5}$ $m^3$/kg.

In one embodiment the pigment may have an additional outer layer on the first layer. The outer layer may comprise a metal oxide. Examples of metal oxides are $TiO_2$, $Fe_2O_3$, FeOOH, $ZrO_2$, $SnO_2$, $Cr_2O_3$, BiOCl, and ZnO. The outer layer may alter the color of the pigment so it is no longer similar to the color of the pigment prior to reduction.

In one embodiment, the process for making a pearlescent pigment comprises the steps of: providing a platelet pigment; increasing the magnetic mass susceptibility; wherein the color difference (ΔE*) between the provided pigment and the resultant pigment is not more than about 5.

In another embodiment, the pearlescent pigment formed by the steps comprising: providing a platelet pigment; increasing the magnetic mass susceptibility; wherein the color difference (ΔE*) between the provided pigment and the resultant pigment is not more than about 5.

The method may be used to transform conventional, metallic-shade, low-magnetic $Fe_2O_3$ coated pearlescent pigments into highly magnetic pigments without changing their apparent color. This expands the available color range of iron-oxide coated magnetic pigments beyond dark colors, such as black or brown, or dark shades with muted interference colors, such as Colorona® Blackstar Blue, Red, Green, and Gold. Based on the process described, traditional bronze, copper, russet and other traditional metallic pearlescent pigments can be applied in magnetically aligned coatings.

In addition, the color difference between the non-magnetic starting material and the magnetic product cannot easily be distinguished by the human eye. This allows for interesting and cost-effective styling opportunities involving both pigments. For example in automotive applications, the described magnetic pearlescent pigment may be used for styling accents, such as three-dimensional emblems, logos, designs, etc, that utilize the magnetic properties of the pigment while the balance of the automotive body may be coated via traditional processes using non-magnetic pearlescent pigments having the same color.

Color matched magnetic and non-magnetic pearlescent pigments may be used in advanced segmented displays based on combinations of the two pigments (dry pigment or un-cured liquid based displays). The two pigments would have equivalent color and be indistinguishable so there would be an undetectable transition between the display segments (containing the magnetic pigments) and the display background (containing the non-magnetic pigments). The display segments and background may contain the non-magnetic and magnetic pigments, respectively. By applying a magnetic field, the magnetic pigments would be re-oriented so they would have a different color than the non-magnetic pigments. Applying a magnetic field with a different orientation would allow the magnetic pigments to have the same color as the non-magnetic pigments. The orientation of the magnetic pigments may persist without applying a magnetic field allowing a more energy efficient display. Another potential application of the color matched magnetic and non-magnetic pigments is in the areas of Security and Brand Protection. 3D effects may be created by preferential orientation of the magnetic flakes in certain directions following a certain shape set by one or more magnetic fields during or right after an ink or coating containing the magnetic flakes has been applied onto a secure document. Such features are almost impossible to reproduce with traditional graphic arts inks. In addition, it is possible to print onto an article a hidden magnetic pattern for example in the form of an image or a code. This hidden image could be read (or authenticated) by a magnetic probe or reader going over the document. Examples of articles may include checks, secure documents such as passports, driver's licenses, ID cards, or credit cards.

The magnetic susceptibility of $\alpha$-$Fe_2O_3$ coated pearlescent pigments may be increased significantly with only small or no change in the overall color (both dry pigment color and the appearance of the pigment in coatings). Magnetic pigments may be produced by the described methods wherein the color of its corresponding coating in regions of maximum platelet orientation normal to the plane of the coating, controlled by an external magnetic field, can be black ($Fe_3O_4$ surface coated) or red ($\gamma$-$Fe_2O_3$ coated).

In order to improve the light, water repellency, weather stability, texture, and dispersion ability, it is frequently advisable to subject the finished pigment to surface treatment, depending on the area of application. Examples of surface treatments are methicone (poly(oxy(methylsilylene))), metal soap, fatty acid, hydrogenated lecithin, dimethicone (polydimethylsiloxane), fluorinated compounds, amino acids, N-acylamino acids, glyceryl rosinates, silanes, and combinations. Many of the processes are described in U.S. Pat. Nos. 6,790,452; 5,368,639; 5,326,392; 5,486,631; 4,606,914; 4,622,074; 5,759,255; 5,759,255; 5,571,851; 5,472,491; 4,544,415; and 5,759,255; German Patent 22 15 191; DE-A 31 51 354; DE-A 3235017; DE-A 3334598; DE 4030727A1; EP 0 649 886 A2; WO 97/29059; WO 99/57204; EP 0090259; EP 0 634 459; WO 99/57204; WO 96/32446; WO 99/57204; WO 01/92425; J. J. Ponjee, Philips Technical Review, Vol. 44, No. 3, 81 ff; and P. H. Harding J. C. Berg, J. Adhesion Sci. Technol. Vol. 11 No. 4, pp. 471-493. This post-coating may further increase the chemical stability or simplify handling of the pigment, in particular incorporation into various media. In order to improve the wettability, dispersibility and/or compatibility with the user media, functional coatings of $Al_2O_3$ or $ZrO_2$ or mixtures thereof may be applied to the pigment surface.

In one embodiment, coupling agents may be used to form an outer layer on the pearlescent pigment. Suitable coupling agents are disclosed in EP 632 109. Examples include, silanes, zirconium aluminates, zirconates, and titanates. The silanes may possess the structure Y—$(CH_2)$n-$SiX_3$ in which n is 2-18, Y is an organofunctional group, e.g. an amino, methacrylic, vinyl, alkyl, aryl, halogen and/or epoxy group, and X is a silicon-functional group which following its hydrolysis reacts with active sites of an inorganic substrate or by condensation with other silicon compounds. This group Y may comprise, for example a hydroxy, a halogen or an alkoxy group.

In addition to these substantially hydrophilic coupling agents, it is also possible to use hydrophobic silanes, especially the aryl-, alkyl- and fluoroalkyl-substituted di- and trimethoxysilanes. These include, for example, phenethyltrimethoxysilane, propyltrimethoxysilane, butyltrimethoxysilane, isobutyltrimethoxysilane, hexyltrimethoxysilane, octyltrimethoxysilane, 1H, 1H, 2H, 2H-perfluorodecyltrimethoxysilane and (3,3,3-trifluoropropyl)methyldimethoxysilane. The concentration of coupling agents may be 0.2-5% by weight with respect to the base pigment.

In one embodiment a cosmetic composition contains the pigment. The cosmetic composition may be useful for make-up products for the skin, the eyes, or hair. Examples of compositions intended as make-up for the skin include eye shadows, eye liners, mascaras, body or face powder, foundations, blushes, colored creams, nail polish, lipsticks, lip gloss, hair or body gel, hair or body wash, cover sticks, lotion, concealer, foundation, and anti-aging cream. Examples of cosmetic applications involving the lip area, are lip gloss, lipstick, and other lip compositions. Nail polish may be referred to as nail varnish, or nail enamel. Other examples of cosmetic compositions include hair coloring compositions, shampoos, skin cream, skin treatment products such as scrubbing, exfoliating, cleansing or acne treatment gels, creams or lotions.

Pearlescent pigments may be used to produce a makeup cosmetic as described in U.S. Pat. Nos. 6,663,852, 6,451,294, and 6,280,714.

The pigment may be applied in a dry form or in combination with binder/additive of sufficient quantity for cosmetic applications. These cosmetics may allow one to create high intensity colors.

In one embodiment, the pigments of the composition are aligned during or after application of the composition. An example of aligning the pigments of the composition is by applied the composition with a magnetic applicator. The magnetic applicator may be used to align the magnetic particles in the cosmetic allowing control of their appearance.

General cosmetic compositions may contain preservatives, stabilizers, neutralizing agents, aqueous-phase thickeners (polysaccharide biopolymers, synthetic polymers) or fatty-phase thickeners, such as clay minerals, fillers, perfumes, hydrophilic or lipophilic active substances, surfactants, antioxidants, film-forming polymers and mixtures thereof. The amounts of these various ingredients are those conventionally employed in the fields in question and, for example, may be from 0.01 to 30% of the total weight of the composition. In one embodiment, the cosmetic composition may further comprise a binder wherein the pigment represents about 0.5% to about 99.5% of the composition.

Lip cosmetic composition may comprise any ingredient usually used in the field concerned, such as water, preferably in an amount ranging from 0 to 95% of the total weight of the composition, water-soluble or liposoluble dyes, antioxidants, essential oils, preserving agents, fragrances, neutralizing agents, liposoluble polymers, in particular hydrocarbon-based polymers such as polyalkylenes or polyvinyl laurate, gelling agents for an aqueous phase, gelling agents for a liquid fatty phase, waxes, gums, surfactants, additional cosmetic or dermatological active agents such as, for example, emollients, moisturizers (for example glycerol), vitamins, liquid lanolin, essential fatty acids, lipophilic or hydrophilic sunscreens, and mixtures thereof. The composition may also contain lipid vesicles of ionic and/or nonionic type. These ingredients (other than the water) may be present in the composition in a proportion of from 0 to 20% of the total weight of the composition.

In one embodiment a composition or article comprises the pigment. The composition may be a coating, ink, plastic, or paint. A coating, ink, plastic, or paint may further comprise a binder, wherein the pigment represents about 0.5% to about 99.5% of the composition, about 0.1% to about 70%, or about 0.2% to about 10%. In one embodiment a composition or article may additionally comprise a pigment with a low or no magnetic susceptibility. In another embodiment an article comprises the pearlescent pigment.

The coating, ink, plastic, or paint may be printing ink, surface coating, coatings for laser marking, pigment preparation, dry preparation, food colorant, automotive coating, refinish coating, textile coating, architectural coating, synthetic fiber, or fiber based product. A coating may be applied to an object as a liquid, vapor, or solid. Examples of methods for applying a coating are by printing, painting, polymeric coating, or spraying. The coating may be a powder, enamel, aerosol, paint, epoxy, or polymer. Additional examples of uses for coating, ink, plastic, or paint are for uses in preventing counterfeiting, such as for secure documents, passport, currency, checks, credit cards and driver licenses; brand protection applications; agricultural, such as seed and mulch coloring; textile coloring; and food applications.

In one embodiment a coating contains the pigment. Examples of uses for the paint may be: industrial, automotive, consumer electronics and architectural. Examples of automotive applications are: OEM, refinish or specialty (custom) automotive applications.

The ink may be a magnetic toner. An example of a magnetic toner is one that is used for Magnetic Ink Character Recognition (MICR). These toners may be used to print security codes on checks and are read by low-cost readers. Many of the toners used for MICR are black. The color and magnetic susceptibility of the MICR ink may be adjusted by using different pearlescent pigments.

The arts of making coatings and inks, as well the various printing processes (i.e., intaglio, flexo, screen, offset, gravure) are very well known in the literatures, so it is not repeated here [see "The Printing Ink Manual", $5^{th}$ edition, R. H. Leach, ed. Taylor & Francis, Inc.]. Other less common printing processes include digital offset solutions such as the Hewlett-Packard Indigo presses.

Besides the topical applications such as printings or coatings, the pigments can be incorporated directly into substrates during the formation stage to make an article. For example, into paper, the pigments can be introduced along with other regular paper fillers such as calcite, talc during paper making to fill the open pores of paper near the surface. If the article is a plastic, the pigment can be introduced during the extrusion of substrate. Examples of articles are plastic, glass, ceramic material, concrete, pressed wood, pills paper, toothpaste, candles, food products, or agricultural products. Other applications where pearlescent pigments may be used include household products such as detergents and cleaning products.

The terms goniochromatic, iridescent, and pearlescent, may be used interchangeably to mean a change of color depending on the viewing angle.

While the present disclosure has illustrated by description several embodiments and while the illustrative embodiments have been described in considerable detail, it is not the intention of the applicant to restrict or in any way limit the scope of the claims to such detail. Additional advantages and modifications may readily appear to those skilled in the art.

EXAMPLES

Example 1

Magnetic Bronze Pearlescent Pigments

Catalyst Preparation:

Anhydrous ethylene glycol (320 g) and K15 polyvinylpyrrolidone (40 g) were mixed at 3000 rpm with a Hauschild mixer until dissolved. The mixture was then added to a 1L PTFE-lined cylindrical reactor with a 2" PTFE coated 3-leaf agitator blade and a nitrogen purging line. In a separate beaker, anhydrous ethylene glycol (320 g) and hydrated chloroplatinic acid crystal (2 g, $H_2PtCl_6$-$6H_2O$) were stirred until homogeneous. The ethylene glycol mixture was then sonicated for 10 minutes to remove oxygen and then charged into the reaction vessel containing the PVP solution. Additional anhydrous ethylene glycol (320 g) was added to the reaction vessel and agitated at approximately 200 rpm under room temperature conditions. A nitrogen purging line was then lowered to just below the liquid surface to provide an inert atmosphere. The mixture was then heated from approximately 20° C. to 120° C. in roughly 100 minutes. After one hour at 120° C., the Pt-in-(PVP/EG) liquid (0.75 mg Pt per g fluid] was cooled, poured into a glass jar and sealed. Highly active, PVP stabilized platinum nanoparticles with a mean particle size in the range of 2-10 nm was obtained.

Reduction:

$Fe_2O_3$ coated natural mica pigment (20 g, SunPearl Bronze (composition shown in Table 1)) and PVP stabilized Pt catalyst (4 g) in ethylene glycol were dispersed in polyethylene glycol 400 (96 g) and added to a 600 mL steel Parr reactor equipped with twin 45 degree pitch blade impellers. Agitation was maintained at approximately 800 rpm. The reaction solution was purged several times by pressurizing the vessel with nitrogen then evacuating under vacuum. Following sufficient purging, the mixture was heated to 220° C., pressurized with hydrogen to 10.3 bar and held at these conditions for 6 hours. The pigment was filtered, rinsed with deionized water (4 L), ethanol (1 L), and dried at 60-80° C. A deep and intensely colored, golden-beige magnetic pearlescent pigment comprised of natural mica containing an inner layer of $\alpha\text{-}Fe_2O_3$ (hematite) and a surface layer of $Fe_3O_4$ (magnetite) was obtained (referred to as Example 1a).

Oxidation:

The golden-beige pigment produced in Example 1a (3.5 g) was heated in air at 350° C. for 45 minutes using a Barnstead Thermolyne Model 1400 box furnace. Calcination transformed the outer magnetite layer into maghemite ($\gamma\text{-}Fe_2O_3$) resulting in a lustrous, bronze-colored magnetic pearlescent pigment (Example 1b).

Pigment Drawdown:

Pigment (SunPearl Bronze, Example 1a, and Example 1b) drawdowns were prepared by dispersing 0.5 g of pigment in 4.5 g of Delstar DMR499 acrylic enamel at 3000 rpm for 3 minutes using a DAC150FVZ-K model (Hauschild Engineering) high speed mixer. The pigment suspensions were then applied to a plain white card (BYK Gardner, AG-5142) using a 3 mil (~76 micron) Bird applicator.

Magnetic Alignment:

Circular button magnets (13 mm ProMAG® Neodymium (Grade 35, 12,300 gauss) magnet) were placed beneath a 0.32 cm thick glass plate. After application of the pigment suspension and prior to curing, the card was placed on the glass plate such that a circular magnet is located directly beneath a selected portion of each coating.

Upon placement of the card, the pigment prepared in Examples 1a and 1b instantaneously oriented into a three-dimensional circular pattern with unique depth of perception. After 10 to 15 minutes in an oven held at 50° C., the three-dimensional image was cured and fixed within the coating.

Color Analysis

CIELab values for all pigments prepared, their corresponding starting pigment, and the magnetically aligned pigments were measured with a Spectraflash SF600 Plus spectrophotometer (9 mm aperture), see Table 2. The magnetically aligned pigments were measured in the center portion of the aligned circular image, the region of highest magnetic force. The aligned pigments display a dramatic color shift induced upon application of the magnetic field.

After hydrogenation, Example 1a has a lower L value ($\Delta L^* = -9.32$), a value ($\Delta a^* = -12.68$), and b value ($\Delta b^* = -12.65$), relative to the starting substrate resulting in an overall color difference ($\Delta E^*$) of 20.19 (see Table 2). The reduction results in an increase in the magnetic mass susceptibility of the starting substrate from $0.019 \times 10^{-5}$ m$^3$/kg to $5.056 \times 10^{-5}$ m$^3$/kg (measured using a Bartington MS2 susceptibility meter).

The increase of the magnetic susceptibility allows the platelet-like pigments to be oriented by an applied magnetic field. As shown in Table 2, application of a magnetic field to uncured coatings containing the pigment produced in Example 1a results in the appearance of a three-dimensional circular image with interesting depth and a very dark black appearance ($L^* = 29.75$ and $C^* = 5.33$) in the region of maximum platelet alignment.

Oxidation of the pigment produced in Example 1a transforms the magnetite ($Fe_3O_4$) surface coating to maghemite ($\gamma\text{-}Fe_2O_3$) resulting in a pearlescent pigment comprising a natural mica substrate with an inner layer of $\alpha\text{-}Fe_2O_3$ (hematite) and a surface layer of $\gamma\text{-}Fe_2O_3$. The $\gamma\text{-}Fe_2O_3$ retains the magnetic properties gained in the reduction step and restores the color of the original substrate ($\Delta E^* = 1.62$). As shown in Table 2, application of a magnetic field to uncured coatings containing the pigment produced in Example 1b results in the appearance of a three-dimensional circular image with interesting depth and a high chroma red appearance ($L^* = 37.28$, $C^* = 30.92$, hue angle=34.41) in the area of maximum platelet orientation.

The $\Delta E^*$ may be further reduced by optimization of the process conditions used in reduction and oxidation for a given substrate.

TABLE 1

Composition of the substrates (supplied by SunChemical) used in Examples 1-3

| Product Name | Mica (%) | $\alpha\text{-}Fe_2O_3$ (%) | Particle Size Range |
| --- | --- | --- | --- |
| SunPearl Bronze | 65-69 | 31-35 | 10 to 60 μm |
| SunPearl Copper | 62-66 | 34-38 | 10 to 60 μm |
| SunPearl Maroon | 57-61 | 39-43 | 10 to 60 μm |

TABLE 2

CIELab values measured for Examples 1-3 using a 10° observer and D65 illuminant with specular component included (9 mm aperture). Color difference ($\Delta E^*$) values are measured relative to SunPearl Bronze, Copper and Maroon for Examples 1, 2 and 3, respectively.

| Example | Sample | Dry Pigment Color | L* | A* | B* | C* | Hue angle | $\Delta E^*$ |
| --- | --- | --- | --- | --- | --- | --- | --- | --- |
| 1 | SunPearl Bronze | Bronze | 62.47 | 19.02 | 28.24 | 34.05 | 56.04 | |
| | Example 1a | Golden-Beige | 53.15 | 6.34 | 15.59 | 16.83 | 67.87 | 20.19 |
| | 3-D Circular Image in Example 1a | | 29.75 | 3.50 | 4.01 | 5.33 | 48.89 | |
| | Example 1b | Bronze | 62.00 | 17.58 | 27.67 | 32.78 | 57.57 | 1.62 |
| | 3-D Circular Image in Example 1b | | 37.28 | 25.51 | 17.47 | 30.92 | 34.41 | |

TABLE 2-continued

CIELab values measured for Examples 1-3 using a 10° observer and D65 illuminant with specular component included (9 mm aperture). Color difference (ΔE*) values are measured relative to SunPearl Bronze, Copper and Maroon for Examples 1, 2 and 3, respectively.

| Example | Sample | Dry Pigment Color | L* | A* | B* | C* | Hue angle | ΔE* |
|---|---|---|---|---|---|---|---|---|
| 2 | SunPearl Copper | Copper | 52.63 | 30.48 | 27.09 | 40.78 | 41.63 | |
|   | Example 2a | Dark Copper | 49.72 | 23.97 | 21.69 | 32.33 | 42.13 | 8.95 |
|   | 3-D Circular Image in Example 2a | | 37.07 | 17.93 | 13.27 | 22.31 | 36.49 | |
|   | Example 2b | Copper | 52.05 | 28.88 | 24.93 | 38.15 | 40.79 | 2.75 |
|   | 3-D Circular Image in Example 2b | | 36.56 | 23.98 | 15.74 | 28.68 | 33.28 | |
| 3 | SunPearl Maroon | Maroon | 45.89 | 32.99 | 16.54 | 36.91 | 26.64 | |
|   | Example 3a | Dark Maroon | 44.17 | 27.83 | 14.09 | 31.20 | 26.85 | 5.96 |
|   | 3-D Circular Image in Example 3a | | 36.01 | 21.87 | 10.66 | 24.33 | 25.99 | |
|   | Example 3b | Maroon | 46.26 | 32.91 | 16.87 | 36.98 | 27.13 | 0.50 |
|   | 3-D Circular Image in Example 3b | | 42.73 | 30.14 | 14.90 | 33.63 | 26.31 | |

Examples 2 and 3

Magnetic Copper and Maroon Pearlescent Pigments

Pearlescent pigment were produced in the same manner as Example 1 except other α-$Fe_2O_3$ coated natural mica metallic shades used were, SunPearl Copper (SunChemical) and SunPearl Maroon (SunChemical). The reduced and re-oxidized shades of SunPearl Copper were Examples 2a and 2b, respectively, while the reduced and re-oxidized shades of SunPearl Maroon were 3a and 3b, respectively.

The drawdown procedure used in Example 1 was applied to the pigments prepared in Examples 2 and 3. CIELab values measured for Examples 2a, 2b, 3a and 3b, as well as in the center portion of the aligned circular images within 2a, 2b, 3a and 3b are shown in Table 2.

The pigments of Examples 1b, 2b, and 3b have different colors because they have different amounts of α-$Fe_2O_3$ and γ-$Fe_2O_3$ layer (Bronze<Copper<Maroon), see Table 3. The magnetic susceptibility of Example 1b was higher than Example 2b, which was higher than Example 3b as shown in Table 4. The trend in magnetic susceptibility (Bronze>Copper>Maroon) may be attributed to the initial α-$Fe_2O_3$ content of the starting material. Given that each substrate was subjected to the same reduction and oxidation treatments, the overall ratio of magnetite or maghemite present in the outer layer to hematite present in the inner layer was higher for Example 1b relative Example 2b, which was higher relative to Example 3b.

Due to different magnetic properties of each sample, the amount of alignment associated with each pigment was slightly different. Pigments of Example 1a and 1b are had a sharp transition between aligned regions exposed to the magnetic field and the regions not exposed to the magnetic field. This sharp transition results in a large region of pigment particles aligned normal to the coating surface yielding a black appearance for Example 1a (magnetite coated) and a red appearance for Example 1b (maghemite coated). Pigments of Example 2 had a slightly more subtle transition giving the appearance of a three dimensional circular hole with less depth than the pigments of Example 1. Only the very center of the circular image of aligned pigments of Example 2a had a dark black appearance. Only the very center of the circular image of aligned pigments of Example 2b had the red absorbance color of maghemite. Pigments of Example 3 had an even more subtle transition than the pigments of Example 2, giving the appearance of a three dimensional circular hole with less depth than the pigments of Example 2.

TABLE 3

Composition of Pigments

| Sample | mica | α-$Fe_2O_3$ | γ-$Fe_2O_3$ | $Fe_3O_4$ |
|---|---|---|---|---|
| Example 1a | 66.5% | 26.0% | 0.0% | 7.5% |
| Example 1b | 67.4% | 24.7% | 7.7% | 0.1% |
| Example 2a | 61.2% | 35.6% | 0.0% | 3.2% |
| Example 2b | 61.4% | 35.0% | 3.3% | 0.2% |
| Example 3a | 58.8% | 38.4% | 0.0% | 2.9% |
| Example 3b | 59.4% | 37.5% | 3.0% | 0.1% |

TABLE 4

Magnetic Susceptibility

| Example | Sample | Magnetic Susceptibility ($m^3$/kg) |
|---|---|---|
| 1 | SunPearl Bronze | $0.019 \times 10^{-5}$ |
|   | Example 1a | $5.056 \times 10^{-5}$ |
|   | Example 1b | $5.204 \times 10^{-5}$ |
| 2 | SunPearl Copper | $0.015 \times 10^{-5}$ |
|   | Example 2a | $1.213 \times 10^{-5}$ |
|   | Example 2b | $0.984 \times 10^{-5}$ |
| 3 | SunPearl Maroon | $0.010 \times 10^{-5}$ |
|   | Example 3a | $0.785 \times 10^{-5}$ |
|   | Example 3b | $0.792 \times 10^{-5}$ |

Example 4

High Chroma Magnetic Orange Pearlescent Pigment
(10-60 micron)

A solution containing 706.2 g of 0.1 M HCl, 33.3 g of 38.4 wt % $FeCl_3$ solution, 192 g prilled urea and 40 g of pigment from Example 1b was charged into a 1 L jacketed pot reactor under agitation at 180 rpm. This initial solution had an approximate pH of 1.8. The solution was then heated to 90° C. to promote the decomposition of urea and a subsequent rise in pH. After about 1 to 2 hours at 90° C., the solution pH rose to approximately 6.3-6.5 indicating completion of the reaction. For work up, the pigment was filtered, rinsed with water, and dried at 65° C. An intensely colored, lustrous magnetic orange pearlescent pigment was obtained.

The invention claimed is:

1. A pigment comprising a substrate and a layer, wherein the layer has regions of $\gamma\text{-}Fe_2O_3$ and $\alpha\text{-}Fe_2O_3$,
    wherein the region of $\gamma\text{-}Fe_2O_3$ is further from the substrate than the region of $\alpha\text{-}Fe_2O_3$.

2. The pigment of claim 1, wherein the substrate is a platelet pigment.

3. The pigment of claim 1, wherein the pigment comprises a substrate selected from the group consisting of natural mica, synthetic mica, glass flakes, metal flakes, talc, kaolin, $Al_2O_3$ platelets, $SiO_2$ platelets, $TiO_2$ platelets, graphite platelet, BiOCl, calcium borosilicate, synthetic alumina, and boron nitride.

4. The pigment of claim 1, wherein located between the substrate and the layer is one or more layers selected from the group consisting of $TiO_2$, $Fe_2O_3$, FeOOH, $ZrO_2$, $SnO_2$, $Cr_2O_3$, BiOCl, and ZnO.

5. The pigment of claim 1, wherein the mean thickness of the layer is about 10 nm to about 350 nm.

6. The pigment of claim 1, wherein the $\alpha\text{-}Fe_2O_3$ to $\gamma\text{-}Fe_2O_3$ ratio is between 0.05 and 50.

7. The pigment of claim 1, wherein the pigment has a magnetic susceptibility of about $0.1\times10^{-5}$ to $15\times10^{-5}$ $m^3/kg$.

8. The pigment of claim 1, wherein the pigment additionally comprises a layer of a metal oxide selected from the group consisting of: $TiO_2$, FeOOH, $ZrO_2$, $SnO_2$, $Cr_2O_3$, BiOCl, and ZnO, where the additional layer is adjacent to the outside surface of the layer containing the $\alpha\text{-}Fe_2O_3$ and $\gamma\text{-}Fe_2O_3$.

9. The pigment of claim 1, wherein the substrate is a fiber.

10. A pigment formed by the steps comprising:
    1) providing a platelet pigment; and
    2) increasing the magnetic mass susceptibility to obtain a resultant pigment;
    wherein the color difference ($\Delta E^*$) between the platelet pigment and the resultant pigment of step 2 is not more than about 5, and
    wherein the resultant pigment includes a substrate and a layer, the layer has regions of $\gamma\text{-}Fe_2O_3$ and $\alpha\text{-}Fe_2O_3$, and the region of $\gamma\text{-}Fe_2O_3$ is further from the substrate than the region of $\alpha\text{-}Fe_2O_3$.

11. The pigment of claim 10, wherein the resultant pigment of step 2 has an $\alpha\text{-}Fe_2O_3$ to $\gamma\text{-}Fe_2O_3$ ratio is between about 0.05 and about 50.

12. The pigment of claim 10, wherein the resultant pigment of step 2 has a magnetic susceptibility of about $0.1\times10^{-5}$ to about $15\times10^{-5}$ $m^3/kg$.

13. A composition or article comprising the resultant pigment of step 2 of claim 10, wherein the composition is selected from the group consisting of a coating, ink, plastic or paint.

14. The composition or article of claim 13, wherein the composition or article additionally comprises the platelet pigment in step 1.

15. The coating of claim 13, wherein the coating is used in automotive applications.

* * * * *